United States Patent [19]
Edler et al.

[11] Patent Number: 5,724,586
[45] Date of Patent: Mar. 3, 1998

[54] METHOD FOR IMPROVING CACHE LOCALITY OF A COMPUTER PROGRAM

[75] Inventors: Jan Sterling Edler, Plainsboro; Kai Li, Princeton; James F. Philbin, Metuchen, all of N.J.

[73] Assignee: NEC Research Institute, Inc., Princeton, N.J.

[21] Appl. No.: 724,562

[22] Filed: Sep. 30, 1996

[51] Int. Cl.⁶ ............................................. G06F 9/46
[52] U.S. Cl. ................. 395/672; 395/678; 364/228.2; 364/228.3; 364/281.6
[58] Field of Search ................. 395/672, 472, 395/678; 364/228.1, 228.2, 228.3, 281.6

[56] References Cited

U.S. PATENT DOCUMENTS 5,287,508  2/1994  Hejnd et al. .................... 395/672

OTHER PUBLICATIONS

"Using Hints to Reduce the Read Miss Penalty for Flat Coma Protocols", Dep. of Comp. Eng., Wde Univ. Sweden, Inter. Conf. on System Science, IEEE 95.

Callahan et al., "Software Prefetching", Proceedings of the 4th International Conference on Architectural Support for Programming Languages and Operating Systems, pp. 40–52, Apr. 1991.

Hennessy et al., "Computer Technology and Architecture: An Evolving Interaction", IEEE Computer, 24(9) pp.18–29, Sep. 1991.

Wulf et al., "Hitting the Memory Wall: Implications of the Obvious", ACM SIGARCH Computer Architecture News, 23(1), pp. 20–24, Mar. 1995.

Abu–Sufah et al., "Automatic Program Transformations for Virtual Memory Computers", Proceedings of the 1979 National Computer Conference, pp. 969–974, Jun. 1979.

*Primary Examiner*—Alvin E. Oberley
*Assistant Examiner*—Majid A. Banankhah
*Attorney, Agent, or Firm*—Jeffery J. Brosemer

[57] ABSTRACT

A method for improving the cache locality of an application executing in a computer system by decomposing the application into one or more threads and subsequently scheduling the execution of the threads such that a next thread to be executed is likely to reside in cache. The method operates by identifying a tour of points through a k-dimensional space such that cache misses are minimized. The space is divided into a plurality of equally sized blocks and may be extended for application to multiple cache levels.

9 Claims, 4 Drawing Sheets

METHOD FOR IMPROVING CACHE LOCALITY OF A COMPUTER PROGRAM

TECHNICAL FIELD

This invention relates generally to computer systems and in particular to a method for enhancing cache locality, that is, a method for increasing the likelihood that particular application program/data is found in cache.

DESCRIPTION OF THE ART AND PROBLEM

The performance gap between central processors and memory has continually widened in the past few years. Specifically, while processor performance has been improving at a rate of about 50% per year, memory performance, and in particular the access time of dynamic random access memories (DRAM), has increased at a rate of only 10% per year. (See, for example, John L. Hennessy and Norman P. Jouppi, "Computer Technology and Architecture: An Evolving Interaction", *IEEE Computer*, 24(9):18–29, September 1991, and William A. Wulf and Sally A. McKee, "Hitting the Memory Wall: Implications of the Obvious", *ACM SIGARCH Computer Architecture News*, 23(1):20–24, March 1995).

To take advantage of the high clock rates achievable with present day processors while keeping memory costs reasonable, techniques such as address pipelining or the use of high-speed temporary storage (cache) are oftentimes used. A cache is a relatively small-sized but high-speed memory, placed between the processor and a larger-sized but slower main memory. Current design methodologies often employ multiple levels of cache. Such a prior-art cache memory system is shown in FIG. 1.

Importantly, the cache size must be reasonably small compared to the total amount of main memory; otherwise, the economy of its use is lost. On the other hand, cache system design must provide a high degree of likelihood that program code and data to be accessed at a given time reside in the cache, otherwise system performance is compromised.

When application code or data is accessed from the cache, a cache "hit" has occurred; if it is accessed from the lower-speed main memory, a cache "miss" has occurred. Cache effectiveness is measured by a factor called the hit rate, which is simply the percentage of accesses that find the code or data in the cache. The hit rate is a function of several factors—the cache size (a major factor), the method used for determining which location(s) to replace when the cache is full, and the nature of the application run at that time.

As the processor/memory performance gap widens, application program performance becomes increasingly sensitive to cache misses. The time needed to check the cache and then access the code or data from the slower main memory adds several clock cycles to the total access time as compared to a system without cache. The "processing cost" associated with a second-level cache miss may be tens of CPU cycles, and is particularly acute in application programs having data sets larger than the cache size and which do not exhibit a high degree of memory reference locality.

Prior art methods have attempted to minimize the processor/memory performance gap by improving the data locality of application programs. One such prior art software technique is called blocking, and has been described by W. Abu-Safah, D. J. Kuck and D. J. Lawrie in an article entitled "Automatic Program Transformations for Virtual Memory Computers", which appeared in *Proceedings of the 1979 National Computer Conference*, pp. 969–974, June 1979, and in an article entitled "Software Prefetching", written by D. Callahan, K. Kennedy and A. Porterfield which appeared in the *Proceedings of the 4th International Conference on Architectural Support for Programming Languages and Operating Systems*, pp. 40–52, April 1991.

The basic idea underlying the blocking method is to restructure a program such that it reuses certain blocks of data that fit in the cache. This method has been shown to reduce capacity cache misses and can be applied to any level of memory hierarchy, including virtual memory, cache, and register store. The blocking method can be performed either automatically or manually, however an automatic implementation is only useful in limited circumstances and a manual implementation is oftentimes complex and difficult to implement.

Consequently, a continuing need remains in the art for methods which efficiently, simply and effectively improve the locality of applications and hence the effectiveness of cache memory.

SUMMARY OF THE INVENTION

The above problem is solved and an advance is made over the art in accordance with the teachings of the present invention directed to a thread scheduling method which advantageously improves the locality of applications on computer systems, thereby enhancing the overall system performance while, at the same time, imposing minimal overhead associated with the creation, scheduling and termination of the threads.

The method decomposes a program into fine-grained threads which are then subsequently scheduled so as to improve the program's locality.

Viewed from one aspect, the scheduling method is incorporated into an application program and operates on the application itself. Viewed from another aspect, the method operates within a computer operating system and acts upon individual applications executing thereunder.

The method generates a k-dimensional space divided into equally sized blocks where each of the threads have one or more hints, e.g. the address of a datum, which serve as coordinates in the k-dimensional space and thereby define a corresponding point in the space. The scheduler determines a short tour, or path, through the points which results in minimizing cache misses. Advantageously, the method may be extended for multiple levels of cache.

BRIEF DESCRIPTION OF THE DRAWING

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

In the following description reference is made at various places to two-dimensional space for simplicity of description. However, the principles are equally applicable to k-dimensional space.

Figure 1:
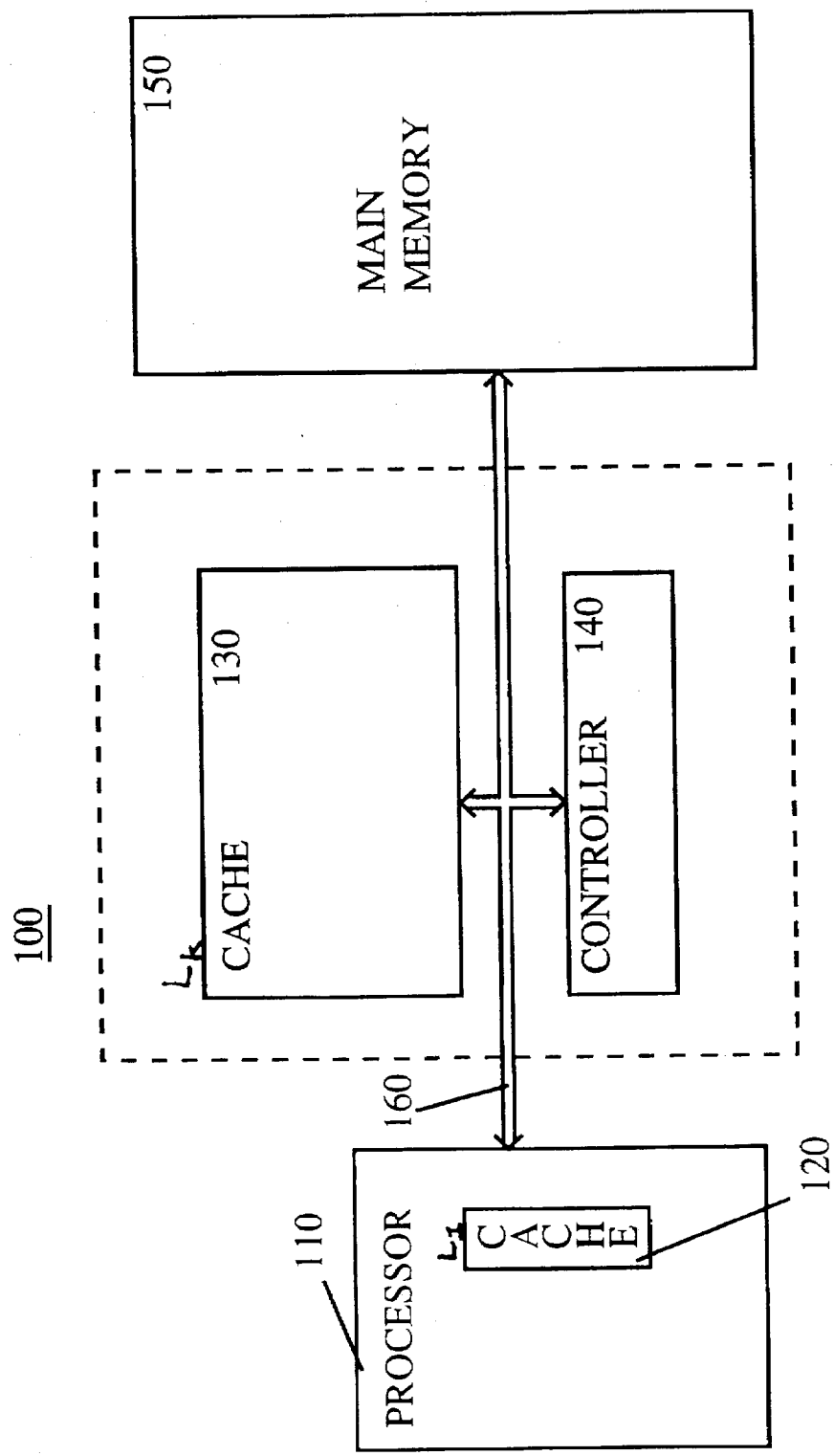
FIG. 1 is a block diagrams of a prior-art cache system.

With reference now to FIG. 1, there is shown a prior art cache memory system. As shown in this Figure, central processor 110 is interconnected with external cache 100 through interconnect 160. The external cache includes a fast cache 130, and optionally, cache controlled 140. In a typical implementation, the fast cache would be static random access memory (SRAM) and slower main memory (150) would be dynamic random access memory (DRAM). Additionally, many present-day, high-performance central processors often include an on-chip cache 120. By way of convention, L1 cache is that cache 120 closest to the processor, and the lowest-level, $L_k$, cache is that cache 130 closest to the memory 150.

In operation, both the on-chip cache 120 and the cache 130 both contain portions of the contents of main memory 150. When the processor attempts to access a desired portion of memory, a check is made to determine whether that desired portion of memory is in the cache (both on-chip and off). If so, the desired portion is simply delivered to the processor for use. If, however, the desired portion of memory is not in cache, then the desired portion of memory is delivered to the cache and then delivered to the processor. Fortunately, when a given portion of memory is fetched and placed in the cache, it is likely that future references will be to other portions of the fetched memory.

Figure 2A:
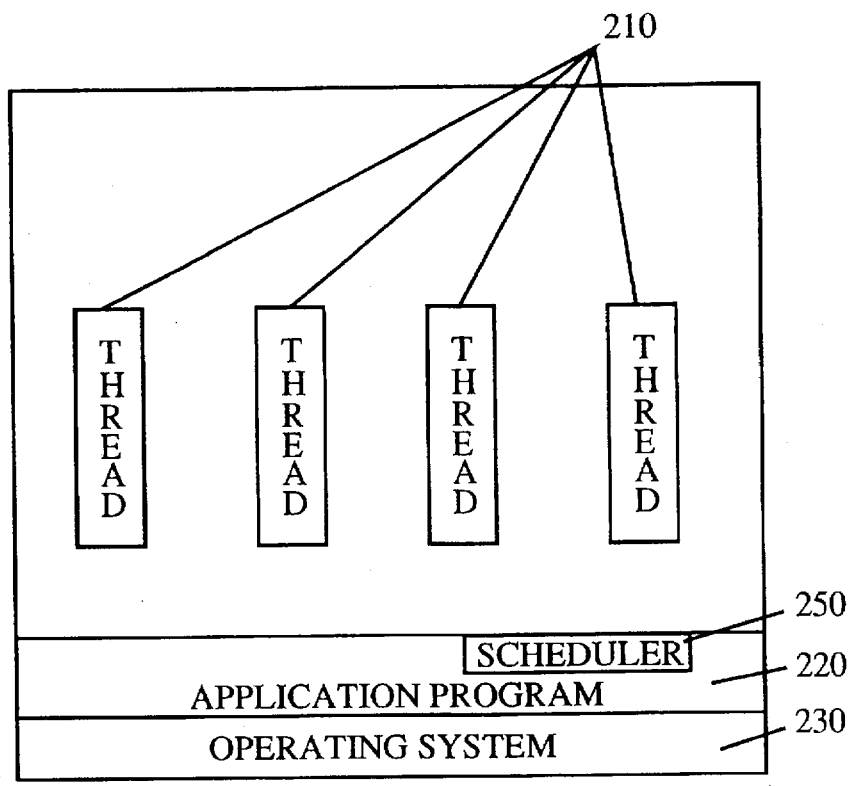
FIG. 2(a) is a block diagram showing the invention as incorporated into a user-application program.
Figure 2B:
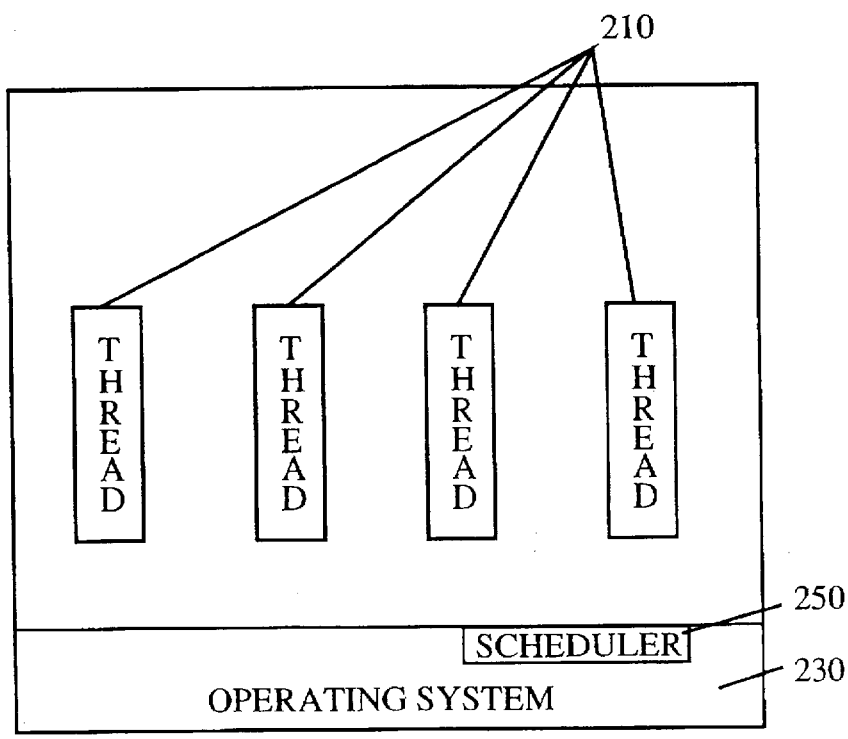
FIG. 2(b) is a block diagram showing the invention as incorporated into an operating system.

The method which is the subject of the present invention decomposes a program into fine-grained threads and then schedules these threads so as to improve the program's locality. Advantageously, and as shown in FIGS. 2(a) and 2(b), the method may be incorporated into a user-level application (user space) or an operating system kernel (kernel space).

By way of background, present day operating systems offer a number of programming abstractions which serve as building blocks for the system. One such abstraction is called a task and this abstraction generally contains all of the resources for a group of cooperating entities such as virtual memory and communications ports. An additional abstraction is a thread, which is an active computation associated with a particular task. Every thread in a system will be associated with a task and multiple threads are often associated with the same task. Importantly for present day systems, threads run concurrently and on a single processor machine the available processor time may be apportioned among the runnable threads and on a multiple processor system, threads may run in parallel.

Turning now to an example, consider a matrix multiplication example, C=A×B, where A, B, and C are all n by n matrices. In order to improve program locality, B is transposed before and after the computation (assuming row-major storage). One implementation uses nested loops as follows:

```
for i = 1 to n
    for j = 1 to n
        C[i,j] = 0;
        for k = 1 to n
            C[i,j] = C[i,j] + A[i,k] * B[j,k];
``` where the inner-most loop (for k=1 to n) computes the dot product of two n-element vectors.

Using fine-grained threads, the dot-product loop may be replaced with a thread as follows:

```
for i = 1 to n
    for j = 1 to n
        Fork (DotProduct,i,j);
RunThreads( );

DotProduct(i,j):
    C[i,j] = 0;
    for k = 1 to n
        C[i,j] = C[i,j] + A[i,k] * B[j,k];
```

While such a simplistic example may be easily performed by hand as shown, "real world" transformations present more significant implementation challenges. More particularly, the "computational cost" of thread creation, scheduling, invocation and termination must be less than the computational cost of cache misses during the dot-product computation. Additionally, a scheduling method must make intelligent decisions that improve program locality.

In order to schedule threads intelligently, a scheduler must be informed about memory references made by the threads. To fully understand the problem, assume that a thread references k pieces of data during its execution and that starting addresses of the k pieces of data are known to the thread scheduler. Assume further that all threads are independent of one another.

Thread $t_i$ is denoted by $t_i(a_{i1}, \ldots, a_{ik})$, where $a_{ij}$ is the starting address of the $j^{th}$ piece of data referenced by thread $t_i$ during its execution. Thus, if n threads are executed in the order $t_1, t_2, \ldots, t_n$, they can be represented by the following permutation:

$$t_1(a_{11}, \ldots, a_{1k}),$$
$$t_2(a_{21}, \ldots, a_{2k}),$$
$$\vdots$$
$$t_n(a_{n1}, \ldots, a_{nk}).$$

Once in this form, the scheduling problem is a k-dimensional geometry problem. In particular, a thread $t_i(a_{i1}, \ldots, a_{ik})$ is a point in the k-dimensional space where the coordinates of the point are $(a_{i1}, \ldots, a_{ik})$. The scheduling problem may then be advantageously viewed as equivalent to finding a tour of the thread points in the space that satisfies the requirement of minimizing cache misses.

Figure 3:
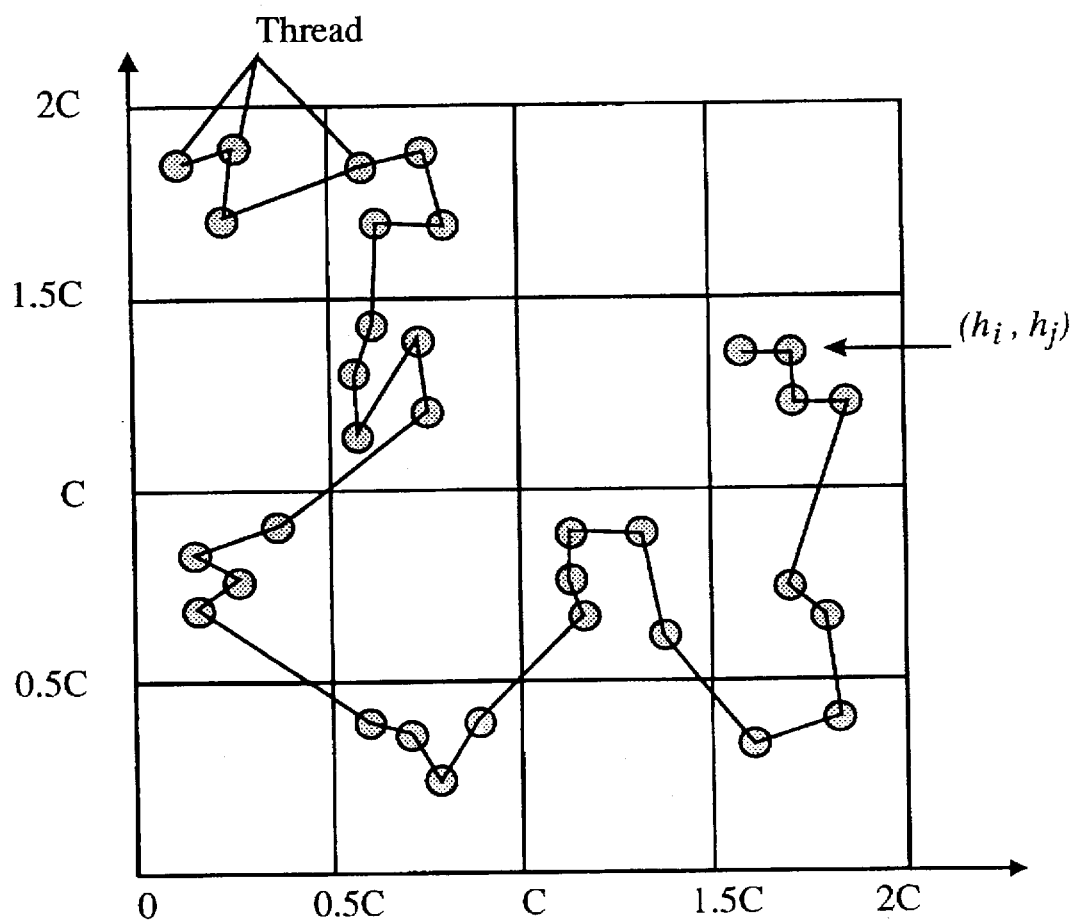
FIG. 3 depicts scheduling threads in a two-dimensional plane in accordance with the teachings of the present invention.

This general problem is then constrained by replacing the set of data $(a_{i1}, \ldots, a_{ik})$ associated with each thread with a set of hints to the scheduler. Typically hints are addresses of the corresponding data. Other types of hints are possible, such as coordinates in a unit multi-dimensional space. In the two-dimensional case, there are two such addresses. Thus constrained, the scheduling problem is reduced to finding a tour of points in a two-dimensional plane as shown in FIG. 3. With reference now to FIG. 3, each thread is represented as a point in the plane having coordinates defined by the two hints, $(h_i, h_j)$. To minimize cache misses, the scheduling method finds a tour that has a "cluster" property, i.e., threads that have the same or similar hints should be clustered together in the tour.

The method divides the k-dimensional space into equally sized blocks. The hints associated with a thread are used as coordinates to place the thread into a unique block. For example, in a 2-dimensional space, two hints $(h_i, h_j)$ of a thread are used as coordinates to place the thread into a unique block. As implemented in a preferred embodiment, each block covers two pieces of user memory, one from each dimension of the block in 2-dimensional space. If the sum of the k dimensions of the block is less than the cache size C, and if the threads falling into the same block are scheduled together, then the execution of the threads in the block will not cause cache capacity misses. Consequently, the size of each dimension of a block is 1/k of the cache size.

When a thread is created during the operation of our inventive method, it is placed in a block of the scheduling plane using two hints. Scheduling involves traversing the blocks along a path, preferably the shortest one. For each non-empty block visited, the scheduler runs all threads in some order. If the scheduler is optimized to minimize cache misses of the lowest level cache, i.e., the second-level cache in a system with two levels of caches, then the order of scheduling threads of the same block can be arbitrary. Since data references of the threads within the same block will all fit into the cache, they will not cause capacity misses.

Additionally, the scheduling method accommodates multiple-level caches by using nested scheduling planes. To accommodate two-levels of caches, a block may be considered as a scheduling plane for the first-level cache. This plane is then divided into equally sized, small blocks. The size of each dimension of each of the small blocks is preferably less than one-half of the first-level cache size. The scheduler will then traverse the small blocks in the nested plane along some path, in a manner similar to that used for traversing the regular blocks in the top-level scheduling plane.

Figure 4:
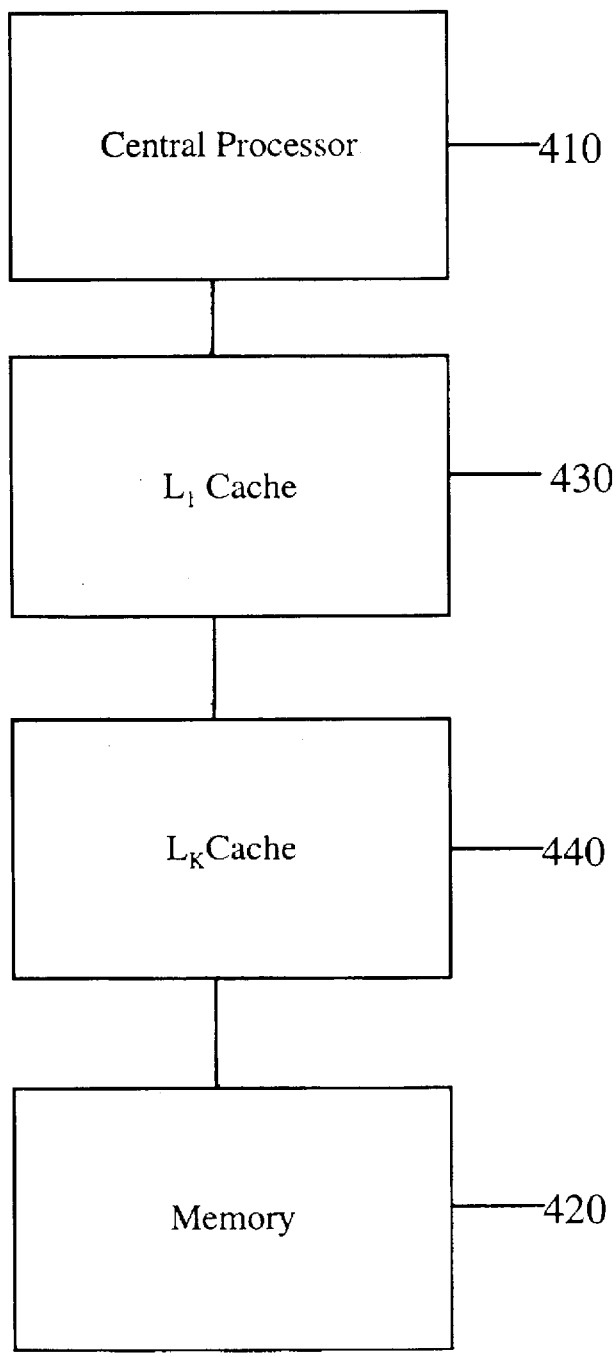
FIG. 4 is a block diagram of a representative computer system where operation of the present invention is carried out.

Turning now to FIG. 4, a system, 400, is shown where the operation of the present invention is carried out. The system consists of a central processor 410, and memory, 420, with one or more levels of cache (430, 440) interposed therebetween. As will be readily apparent to those skilled in the art, $L_k$ Cache 440 is typically the largest, slowest, and the closest cache block to the memory 420 and is generally referred to as the lowest level cache. Such multi-level cache configurations are generally known and readily incorporated into present-day computer systems.

The above description is considered to be only an illustrative embodiment of the invention. It is to be understood that various and numerous other arrangements may be devised by one skilled in the art without departing from the scope of the invention. The invention is thus limited only as defined by in the accompanying claims.

What is claimed is:

1. A method for improving the cache locality of an application executing in a computer system, said method comprising the computer implemented steps of:
   decomposing the application into one or more threads;
   scheduling the successive execution of said threads such that if there exists a next thread to be executed, it is likely to reside in cache, wherein said scheduling includes the steps of:
   identifying a tour of said threads in a space that satisfies a requirement for reducing cache misses; and
   providing one or more hints associated with each of said threads;
   wherein said space is k-dimensional space and each of said threads is represented by a corresponding point in the space and each point is defined by at least one hint associated with said thread.

2. The method according to claim 1 wherein each said hint is an address.

3. The method according to claim 1 wherein said k-dimensional space is divided into equally sized blocks such that at least one hint associated with said thread identifies one of the blocks.

4. The method according to claim 3 wherein each said hint is an address.

5. The method according to claim 3 wherein said tour is a path through the blocks in the space.

6. The method according to claim 3 wherein one of said blocks is a scheduling space for a higher-level cache.

7. The method according to claim 6 wherein said lowest-level cache scheduling space is divided into equally sized blocks.

8. The method according to claim 1 wherein said scheduling is performed within a user space by the application.

9. The method according to claim 1 wherein said scheduling is performed within a computer operating system.

* * * * *